United States Patent
Chang et al.

(10) Patent No.: US 8,831,332 B2
(45) Date of Patent: Sep. 9, 2014

(54) COMPUTING DEVICE AND METHOD FOR EXTRACTING DATA OF PRODUCT FOR USE IN CONSTRUCTION OF POINT CLOUD

(75) Inventors: Chih-Kuang Chang, New Taipei (TW); Xin-Yuan Wu, Shenzhen (CN); Gen Yang, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 267 days.

(21) Appl. No.: 13/523,899

(22) Filed: Jun. 15, 2012

(65) Prior Publication Data

US 2013/0156292 A1 Jun. 20, 2013

(30) Foreign Application Priority Data

Dec. 14, 2011 (CN) .......................... 2011 1 0416952

(51) Int. Cl.
*G06K 9/00* (2006.01)
(52) U.S. Cl.
USPC ........................................................ 382/141
(58) Field of Classification Search
CPC ... G06T 7/0002; G06T 7/0004; G06T 7/0006; G06T 2207/30141; G06T 2207/30148; G06T 2207/30164; G06T 2207/10028
See application file for complete search history.

(56) References Cited

U.S. PATENT DOCUMENTS

| 5,621,648 | A  | * | 4/1997 | Crump ........................... 700/112 |
| 6,041,132 | A  | * | 3/2000 | Isaacs et al. ................... 382/100 |
| 7,012,701 | B2 | * | 3/2006 | Hassler et al. ................. 356/601 |
| 2002/0035450 | A1 | * | 3/2002 | Thackston ........................ 703/1 |

* cited by examiner

*Primary Examiner* — Chan Park
*Assistant Examiner* — Elisa Rice
(74) *Attorney, Agent, or Firm* — Novak Druce Connolly Bove + Quigg LLP

(57) ABSTRACT

In a method for extracting data of a product, an electronic design document related to the product and point cloud created using actual measurements of the product are received. The point cloud includes points of the product. The method aligns the curved surface of the product with the corresponding portion of the point cloud using a best-fit method, creates a maximum space box for a feature element of the product, and deletes points that are not within the maximum space box. According to an average distance between two neighboring points of the point cloud, the maximum space box can be divided into many small space boxes. Using the small space boxes, the points are filtered to form a feature element.

15 Claims, 6 Drawing Sheets

COMPUTING DEVICE AND METHOD FOR EXTRACTING DATA OF PRODUCT FOR USE IN CONSTRUCTION OF POINT CLOUD

BACKGROUND

1. Technical Field

Embodiments of the present disclosure generally relate to coordinate measurement methods, and more particularly to a computing device, a storage medium, and a method for obtaining required data of a product for use in a point cloud then extracting feature elements of the product from the point cloud to ensure compliance of the product.

2. Description of Related Art

In automated processes, a workpiece (such as a product) on a production line should be carefully measured The measurements are used in a point cloud, and a computer can then examine feature elements of the product to ensure that quality of the product is within predetermined tolerances. However, it is difficult to accurately extract only the points of the feature element being checked; meaning neighboring points may be included, which influence the checking precise. Therefore, an improved extraction method is desirable to address the aforementioned issues.

DETAILED DESCRIPTION

In general, the term "module," as used herein, refers to logic embodied in hardware or firmware, or to a collection of software instructions, written in a programming language, such as, for example, Java, C, or assembly. One or more software instructions in the modules may be embedded in firmware, such as in an EPROM. It will be appreciated that modules may comprise connected logic units, such as gates and flip-flops, and may comprise programmable units, such as programmable gate arrays or processors. The modules described herein may be implemented as either software and/or hardware modules and may be stored in any type of non-transitory computer-readable medium or computer storage device. It should be understood that the term "memory module" as used herein, refers to physical individual pieces (sticks) of memory in a computing system.

Figure 1:
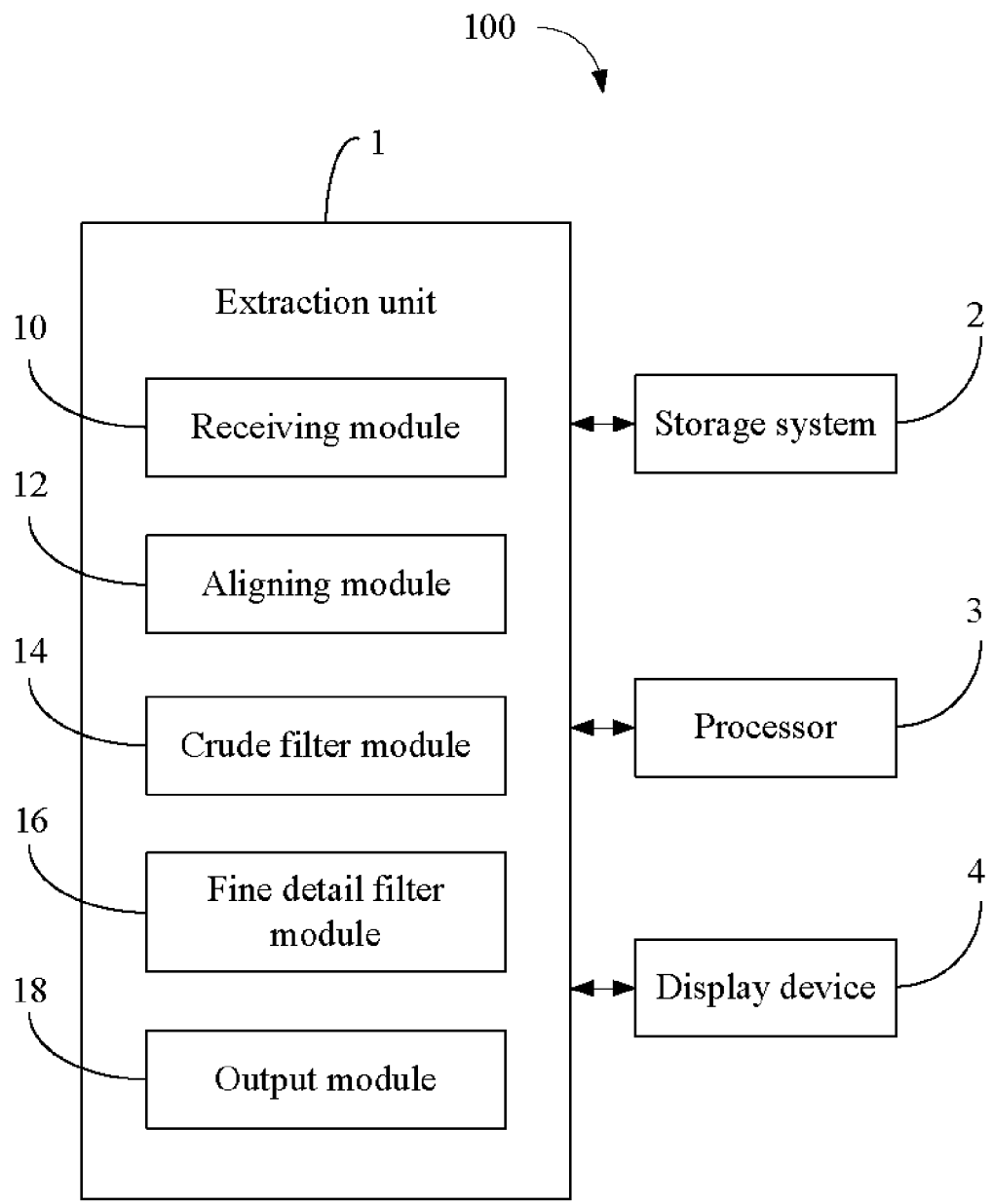
FIG. 1 a block diagram of one embodiment of a computing device including a extraction unit.

FIG. 1 is a block diagram of one embodiment of a computing device 100 including an extraction unit 1. The computing device 100 further includes a storage system 2, at least one processor 3, and a display device 4. In one embodiment, the computing device 100 may be a computer, a server, a portable electronic device, or any other data processing device. Functions of the extraction unit 1 are implemented by the computing device 100. The extraction unit 1 may be a software program stored in the storage system 2 and executed by the processor 3.

In one embodiment, the storage system 2 may be a magnetic or an optical storage system, such as a hard disk drive, an optical drive, a compact disc, a digital video disc, a tape drive, or other suitable storage medium. The processor 3 may be a central processing unit including a math co-processor, for example.

In one embodiment, the extraction unit 1 includes a receiving module 10, an aligning module 12, a crude filter module 14, a fine detail filter module 16, and an output module 18. Each of the modules 10-18 may be a software program including one or more computerized instructions that are stored in the storage system 2 and executed by the processor 3.

The receiving module 10 receives an electronic design document (e.g., a computer aided drawing) of a product, receives point cloud created using actual measurements of the product, and a tolerance between a curved surface of the product in the electronic design document and the point cloud. In the embodiment, the product may be an electronic component, such as a motherboard of a computer, for example. The electronic design document can be edited by an operator, the point cloud is obtained from a measurement machine used to check the product, and the tolerance can be predefined by the operator. The point cloud includes many points of the product.

The aligning module 12 aligns the curved surface of the product with a corresponding portion of the point cloud using a best-fit method.

In detail, the aligning module 12 constructs a first coordinate system according to feature elements of the product, constructs a second coordinate system according to the portion of the point cloud corresponding to the feature elements as actually measured, and constructs a third coordinate system relating the first coordinate system to the second coordinate system. It may be understood that the feature elements may be selected by a user according to a predetermined criteria. In one embodiment, each of the feature elements is selected from a group consisting of a point, a line, a plane, a circle, a column, a taper, a sphere, a curve, and a triangular facet. In the embodiment, the triangular facet is a plane composed of several triangles.

In one embodiment, the aligning module 12 firstly determines an origin of the third coordinate system by obtaining an intersection point of an x-axis of the first coordinate system and a y-axis of the second coordinate system. Then, the aligning module 12 determines the x-axis of the third coordinate system by obtaining a normal vector of the x-axis of the first coordinate system. The aligning module 12 determines the y-axis of the third coordinate system by obtaining a normal vector of the y-axis of the second coordinate system. The aligning module 12 constructs the third coordinate system. The aligning module 12 computes an operation matrix according to the third coordinate system, moves each point of the product by multiplying a coordinate value of each point of the product using the operation matrix, so as to align the curved surface of the product with the corresponding portion of the point cloud.

The crude filter module 14 creates a maximum space box for a localized part (such as a feature element) of the product by determining a maximum coordinate value (represented as "ptMax") and a minimum coordinate value (represented as "ptMin") of the feature element in the x-axis, the y-axis, and the z-axis of a coordinate system. In one embodiment, a function of the maximum space box is: boxSur(ptMin.x, ptMin.y, ptMin.z, ptMax.x, ptMax.y, ptMax.z). The crude filter module 14 further eliminates points that are not within the maximum space box. In detail, if an x-axis coordinate value of a point "a" is in a first range of ptMin.x and ptMax.x, a y-axis coordinate value of the point "a" is in a second range of ptMin.y and ptMax.y, and a z-axis coordinate value of the point "a" is in a third range of ptMin.z and ptMax.z, the crude filter module 14 determines that the point "a" is within the maximum space box. Otherwise, if any one of the coordinate values is not in the corresponding range, for example, the x-axis coordinate value of a point "a" is not in the first range, the y-axis coordinate value of the point "a" is not in the second range, or the z-axis coordinate value of the point "a" is not in the third range, the crude filter module 14 determines that the point "a" is not within the maximum space box, and the crude filter module 14 will eliminate the point "a."

The fine detail filter module 16 is used for deleting the points that do not at least generally correspond to points of the feature element in the maximum space box, and obtaining only points of interest. In order to obtain the point of interest, the fine detail filter module 16 divides the maximum space box into a plurality of small space boxes according to an average distance between two neighboring points of the point cloud, and the maximum coordinate values and the minimum coordinate values of the feature element. And then, the fine detail filter module 16 obtains the points of interest by filtering the points of the point cloud using the plurality of small space boxes.

The output module 18 outputs the points of interest to the display device 4, and draws a feature element of the product based on the points of interest, which is also displayed on the display device 4.

Figure 2:
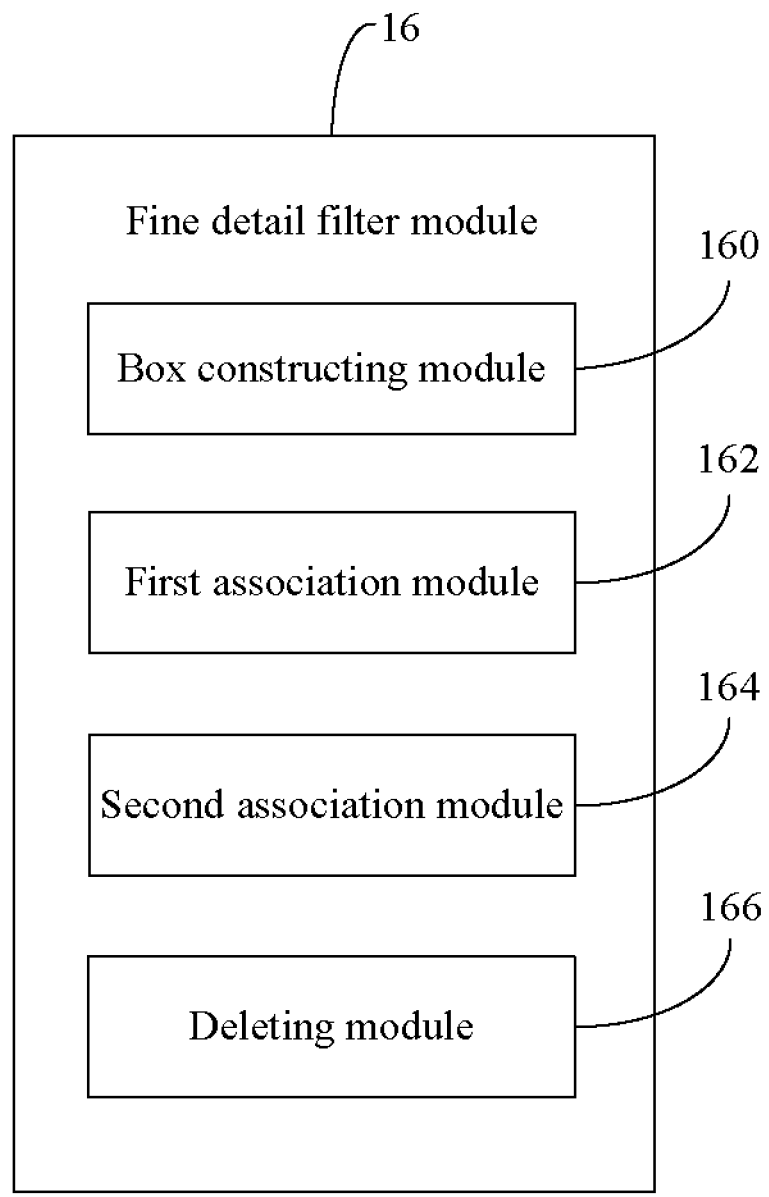
FIG. 2 is a block diagram of one embodiment of function module of a fine detail filter module in FIG. 1.

FIG. 2 is a block diagram of one embodiment of function modules of the fine detail filter module 16 in FIG. 1. In one embodiment, the fine detail filter module 16 includes a box constructing module 160, a first association module 162, a second association module 164, and a deleting module 166.

The box constructing module 160 divides the maximum space box into a lot of small space boxes according to an average distance (represented by "dBoxStep") between two neighboring points of the point cloud, and the maximum coordinate values and the minimum coordinate values of the feature element. Each of the small space boxes corresponds to a data array. The data array saves attributes of the small space box, for example, the attributes include coordinate values of vertexes of the small space boxes.

The total number of the small space boxes can be determined by a formula: iBoxNum=nRefX*nRefY*nRefZ. nRefX is the total number of the small space boxes having an x-coordinate with an absolute value greater than zero, nRefY is a total number of the small space boxes having a y-coordinate with an absolute value greater than zero, and nRefZ is a total number of the small space boxes having a z-coordinate with an absolute value greater than zero, where nRefX=(ptMax[X]−ptMin[X])/dBoxStep, nRefY=(ptMax[Y]−ptMin[Y])/dBoxStep, and nRefZ=(ptMax[Z]−ptMin[Z])/dBoxStep.

The first association module 162 divides the curved surface of the product into a mesh of triangles, and determines whether one of the triangles intersects with a small space box. Details of the determination method is described in FIG. 5. In one embodiment, if any of the triangles intersects with any of the small space boxes, the first association module 162 adds an identifier of the intersecting triangles into the data array. In other words, by inputting the identifier of any intersecting triangle into the data array of the small space box, the small space box has an associated triangle. In another embodiment, if there are no intersecting triangles for a particular small space box, the first association module 162 determines that the small space box does not correspond to the curved surface of the product. The first association module 162 further computes intersections of sides of each triangle and each small space box, and determines that the triangle intersects with the small space box if one of the intersections is within the small space box.

The second association module 164 calculates a unique identifier nG for each small space box containing at least one point. Unique identifiers are calculated as follows:

$nPosX=(inSurBoxPts[i].x-ptMin[X])/dBoxStep;$ $nPosY=(inSurBoxPts[i].y-ptMin[Y])/dBoxStep;$ $nPosZ=(inSurBoxPts[i].z-ptMin[Z])/dBoxStep;$ $nG=nPosX*nYZ+nPosY*nRefZ+nPosZ.$ The second association module 164 further determines whether each of the small space boxes whose unique identifier are nG has a associated triangle. If any small space box whose unique identifier is nG has a associated triangle, the second association module 164 associates the small space box with the at least one point that is within the small space box.

Upon the condition that the small space box whose unique identifier is nG does not have a associated triangle, the deleting module 166 deletes the small space box. Furthermore, the deleting module 166 deletes the points that are not within any one of the small space boxes, and obtains a group of remaining points.

The deleting module 166 further calculates a distance between each of the remaining points and a corresponding small space box that encloses the remaining point. Upon the condition that the distance between the remaining point and the corresponding small space box is greater than the tolerance, or a normal direction of the remaining point is different from a normal direction of the corresponding small box, the deleting module 166 deletes the remaining point from the group of remaining points.

Figure 3:
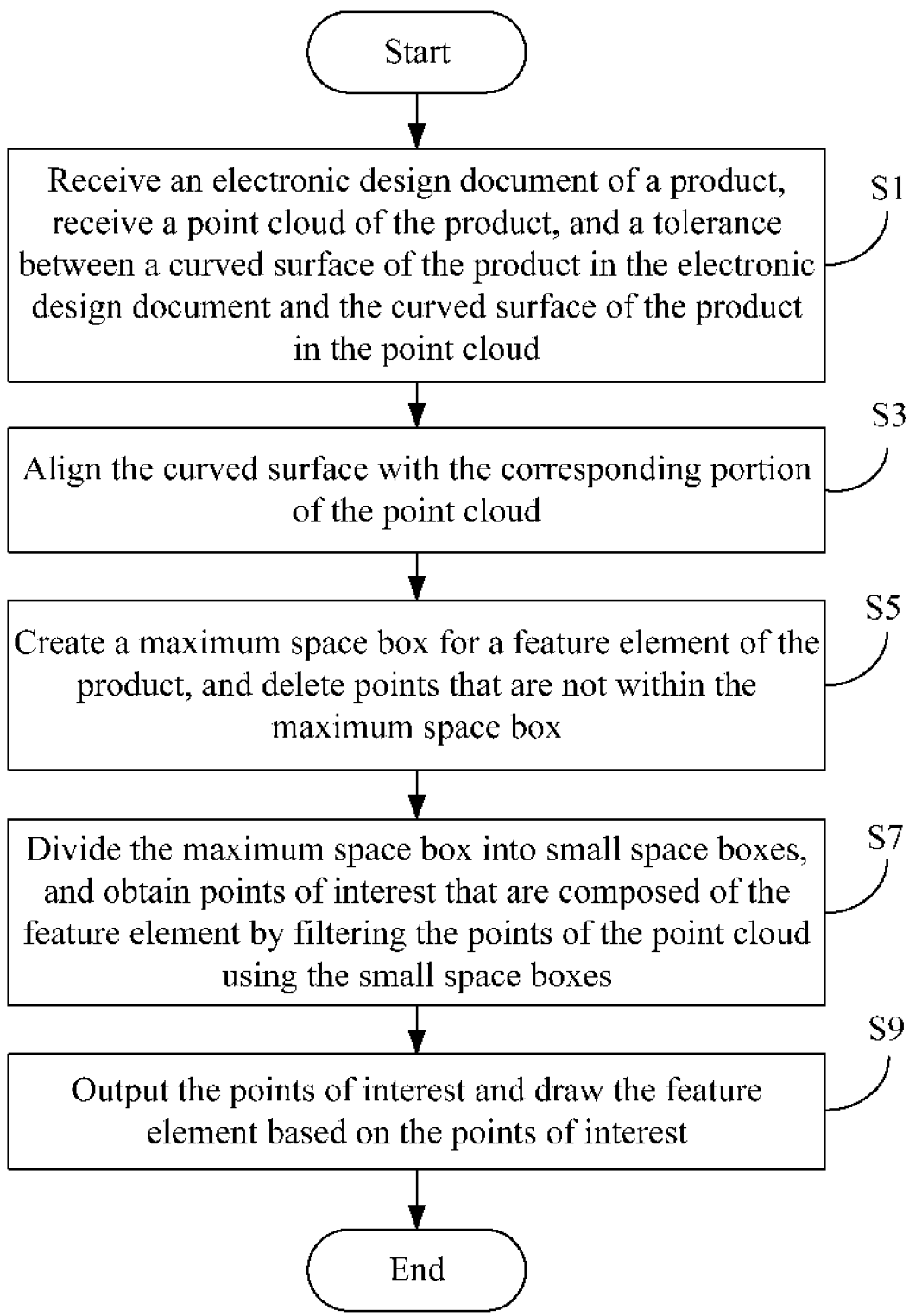
FIG. 3 is a flowchart illustrating one embodiment of a method for extracting feature elements of a product using the computing device of FIG. 1.

FIG. 3 is a flowchart illustrating one embodiment of a method for extracting feature elements of a product using the computing device 100 of FIG. 1. Depending on the embodiment, additional blocks may be added, others removed, and the ordering of the blocks may be changed.

In step S1, the receiving module 10 receives an electronic design document related to the product, receives point cloud created using actual measurement of the product, and a tolerance between a curved surface of the product in the electronic design document and the point cloud. In the embodiment, the point cloud naturally includes many points.

In step S3, the aligning module 12 aligns the curved surface of the product with the corresponding portion of the point cloud using a best-fit method. In detail, the aligning module 12 constructs a first coordinate system according to feature elements of the product as designed, constructs a second coordinate system according to the portion of the point cloud corresponding to the feature elements as actually measured, and constructs a third coordinate system relating the first coordinate system to the second coordinate system. After that, the aligning module 12 computes an operation matrix according to the third coordinate system, moves each point of the product by multiplying a coordinate value of each point of the product using the operation matrix, so as to align the curved surface of the product with the corresponding portion of the point cloud.

In step S5, the crude filter module 14 creates a maximum space box for an interested part of the product by determining a maximum coordinate value and a minimum coordinate value of the interested part in an x-axis, a y-axis, and a z-axis of a coordinate system, and eliminates points that are not within the maximum space box. In one embodiment, the interested part may be a feature element of the product. It may be understood that, the feature elements may be selected by a user according to a predetermined criteria. In one embodiment, each of the feature elements is selected from a group consisting of a point, a line, a plane, a circle, a column, a taper, a sphere, a curve, and a triangular facets. In the embodiment, the triangular facets is a plane composed by several triangular.

In one embodiment, a function of the maximum space box is: boxSur(ptMin.x, ptMin.y, ptMin.z, ptMax.x, ptMax.y, ptMax.z). If an x-axis coordinate value of a point "a" is in a first range of ptMin.x and ptMax.x, a y-axis coordinate value of the point "a" is in a second range of ptMin.y and ptMax.y, and a z-axis coordinate value of the point "a" is in a third range of ptMin.z and ptMax.z, the crude filter module 14 determines that the point "a" is within the maximum space box. Otherwise, if no coordinate value is in the corresponding range, the crude filter module 14 determines that the point "a" is not within the maximum space box, and the crude filter module 14 will eliminate the point "a."

In step S7, the fine detail filter module 16 divides the maximum space box into a plurality of small space boxes according to an average distance between two neighboring points of the point cloud, the maximum coordinate values and the minimum coordinate values of the feature element, and obtains points of interest that are composed of the feature element by filtering the points of the point cloud using the plurality of small space boxes. Details are described in FIG. 4.

In step S9, the output module 18 outputs the points of interest to the display device 4, and draws the feature element of the product based on the points of interest, which is also displayed on the display device 4.

Figure 4:
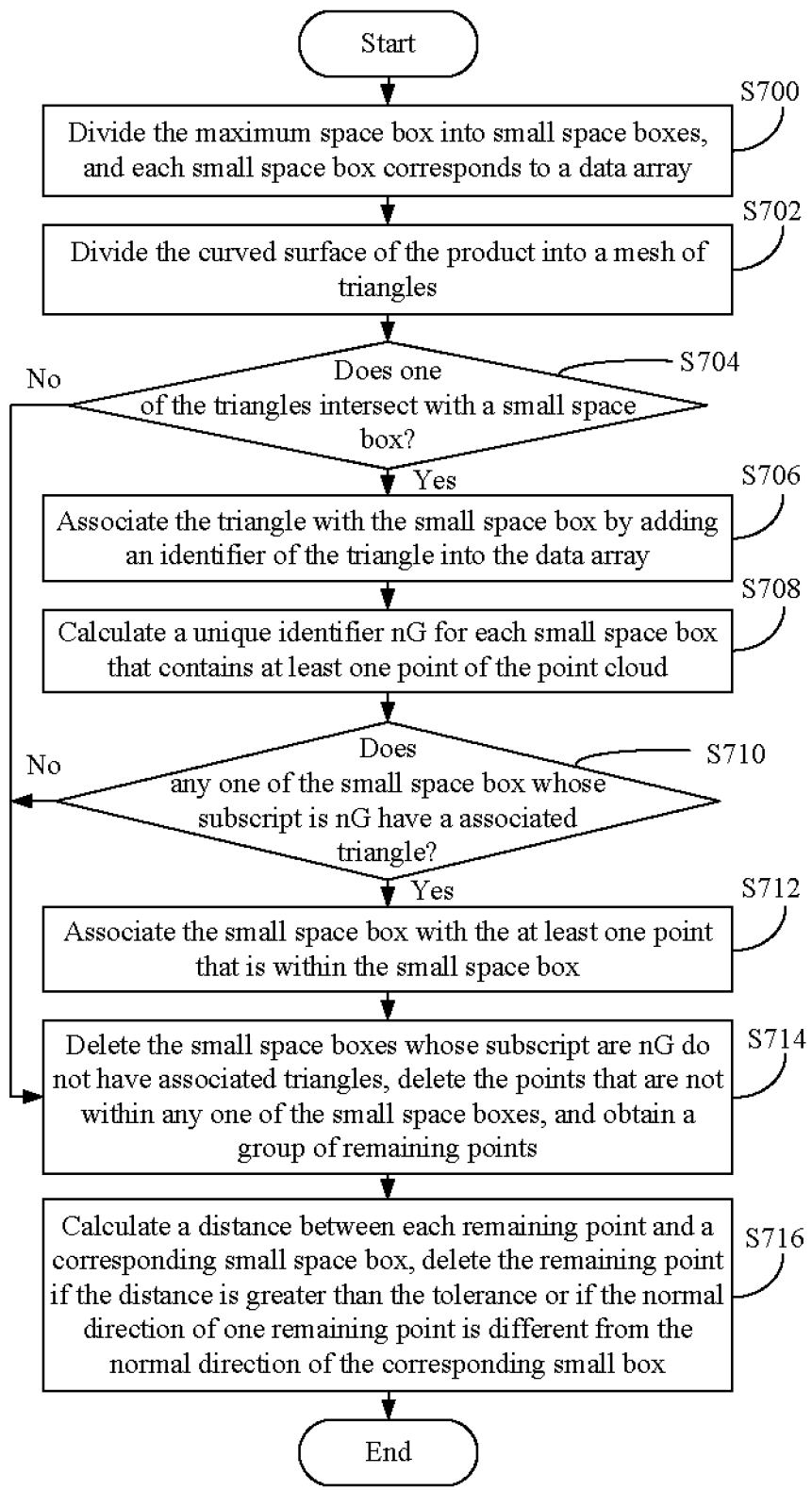
FIG. 4 is a detailed description of step S7 in FIG. 3.

FIG. 4 is a detailed description of step S7. Depending on the embodiment, additional blocks may be added, others removed, and the ordering of the blocks may be changed.

In step S700, the box constructing module 160 divides the maximum space box into a plurality of small space boxes according to the average distance (represented by "dBoxStep") between two neighboring points of the point cloud, and the maximum coordinate values (represented by "ptMax") and the minimum coordinate values (represented by "ptMin") of the feature element. Each of the small space boxes corresponds to a data array.

Supposing that nRefX is a total number of the small space boxes having an x-coordinate with an absolute value greater than zero, nRefY is a total number of the small space boxes having an x-coordinate with an absolute value greater than zero, and nRefZ is a total number of the small space boxes having an x-coordinate with an absolute value greater than zero, where nRefX=(ptMax[X]−ptMin[X])/dBoxStep, nRefY=(ptMax[Y]−ptMin[Y])/dBoxStep, and nRefZ=(ptMax[Z]−ptMin[Z])/dBoxStep. The total number of the small space boxes iBoxNum can be computed by following: iBoxNum=nRefX*nRefY*nRefZ.

In step S702, the first association module 162 divides the curved surface of the product into a mesh of triangles.

In step S704, the first association module 162 determines whether one of the triangles intersects with a small space box. Upon the condition that any of the triangles intersects with any of the small space boxes, step S706 is implemented. Upon the condition that there are no intersecting triangles for a particular small space box, step S714 is implemented. Details of determining whether one of the triangles intersects with a small space box is described in FIG. 5.

In step S706, the first association module 162 associates the triangle with the small space box by adding an identifier of the intersecting triangle into the data array of the small space box. In other words, by inputting the identifier of the intersecting triangle into the data array, the small space box has an associated triangle.

In step S708, the second association module 164 calculates a unique identifier nG for each small space box containing at least one point of the point cloud.

In step S710, the second association module 164 determines whether each small space box whose unique identifier is nG has a associated triangle. If the small space box whose unique identifier is nG has a associated triangle, step S712 is implemented. If the small space box whose unique identifier is nG does not have a associated triangle, the flow goes to step S714.

In step S712, the second association module 164 associates the small space box with the at least one point that is within the small space box.

In step S714, the deleting module 166 deletes the small space boxes whose unique identifiers are nG do not have associated triangles (namely do not intersect with any one of the triangles), deletes the points that are not within any one of the small space boxes, and obtains a group of remaining points after the deleting.

In step S716, the deleting module 166 calculates a distance between each of the remaining points and a corresponding small space box that is associated with the remaining point. For example, a small space box "a" has a associated triangle "b," and a point "c" is within the small space box "a," the deleting module 166 calculates the distance between the point "c" and the triangle "b." If the distance between the point "c" and the triangle "b" is greater than the tolerance, the deleting module 166 deletes the point "c". Otherwise, if the distance between the point "c" and the triangle "b" is not greater than the tolerance, the deleting module 166 remains the point "c."

In the step S716, the deleting module 166 determines whether a normal direction of each of the remaining points is different from a normal direction of the corresponding small box that is associated with the remaining point. In one embodiment, if the normal direction of one remaining point is different from the normal direction of the corresponding small box that is associated with the remaining point, the deleting module 166 deletes the remaining point from the group of remaining points. In another embodiment, if the normal direction of one remaining point is the same as the normal direction of the corresponding small box, the deleting module 166 determines that the remaining point is a point of interest.

Figure 5:
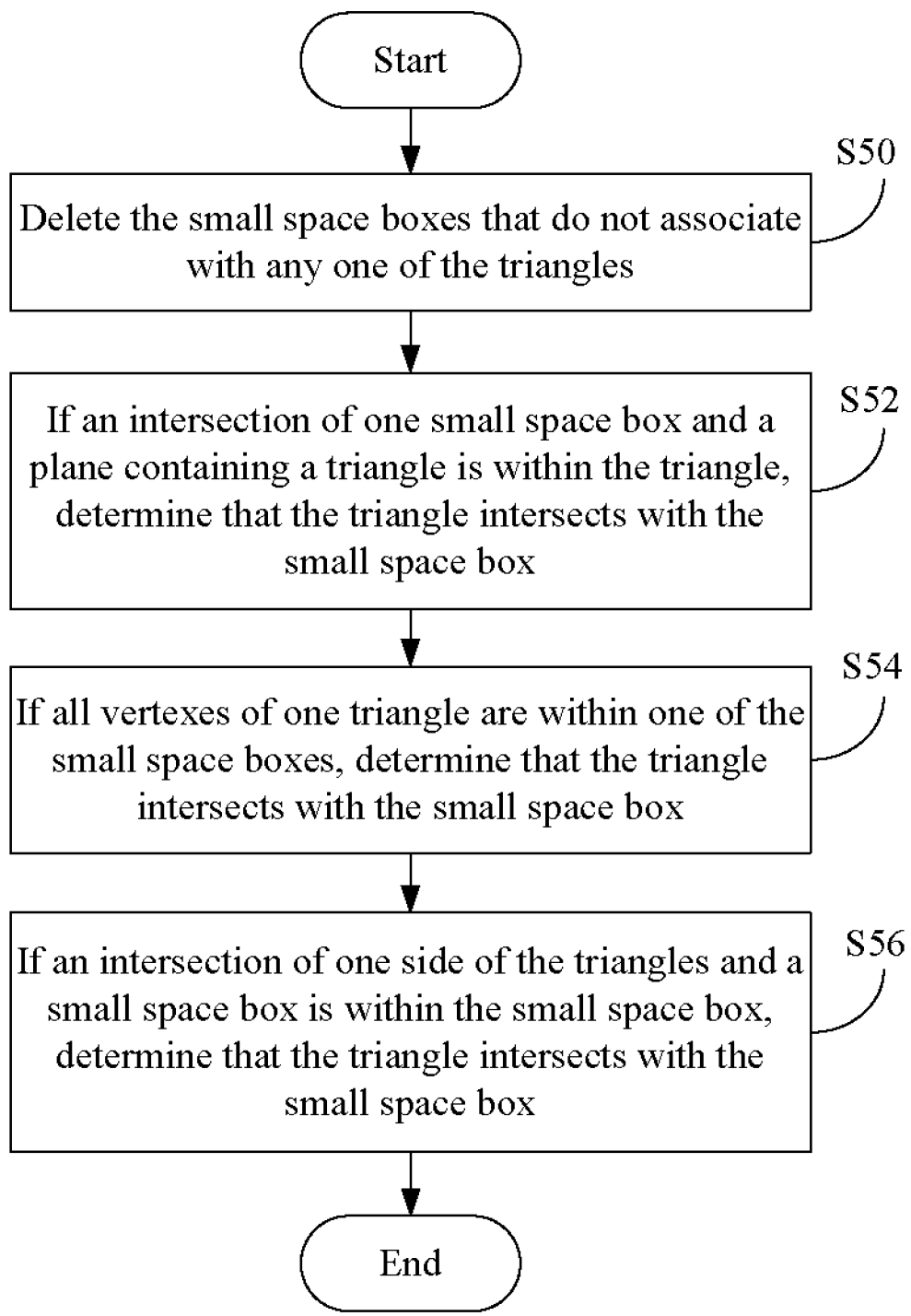
FIG. 5 is a detailed description of step S704 in FIG. 4.

FIG. 5 is a detailed description of step S704 in FIG. 4. In step S50, the first association module 162 deletes the small space boxes that do not associate with any one of the triangles. Before deleting the small space boxes, the first association module 162 is required to determine whether any of the triangles intersect with any of the small space boxes. The determining method is described in FIG. 6 in detail.

In step S52, the first association module 162 determines whether an intersection of one small space box and a plane containing a triangle is within the triangle. For example, the intersection of the small space box "m" and a plane containing the triangle "n" is a point "o," the first association module 162 determines whether the intersection "o" is within the triangle "n."

If the intersection "o" is within the triangle "n," the first association module 162 determines that the small space box "m" intersects with the triangle "n." If the intersection "o" is not within the triangle "n," the first association module 162 determines that the small space box "m" does not intersect with the triangle "n."

In step S54, the first association module 162 determines whether all vertexes of each triangle are within any one of the small space boxes. Upon the condition that all vertexes of the triangle are within one of the small space boxes, the first association module 162 determines that the triangle intersects with the small space box.

In step S56, the first association module 162 computes intersections of sides of each triangle and each small space box, and determines whether one of the intersections is within the small space box. If one of the intersections is within the small space box, the first association module 162 determines that the triangle intersects with the small space box. It is noted that there is no order between the step S52, the step S54 and the step S56.

Figure 6:
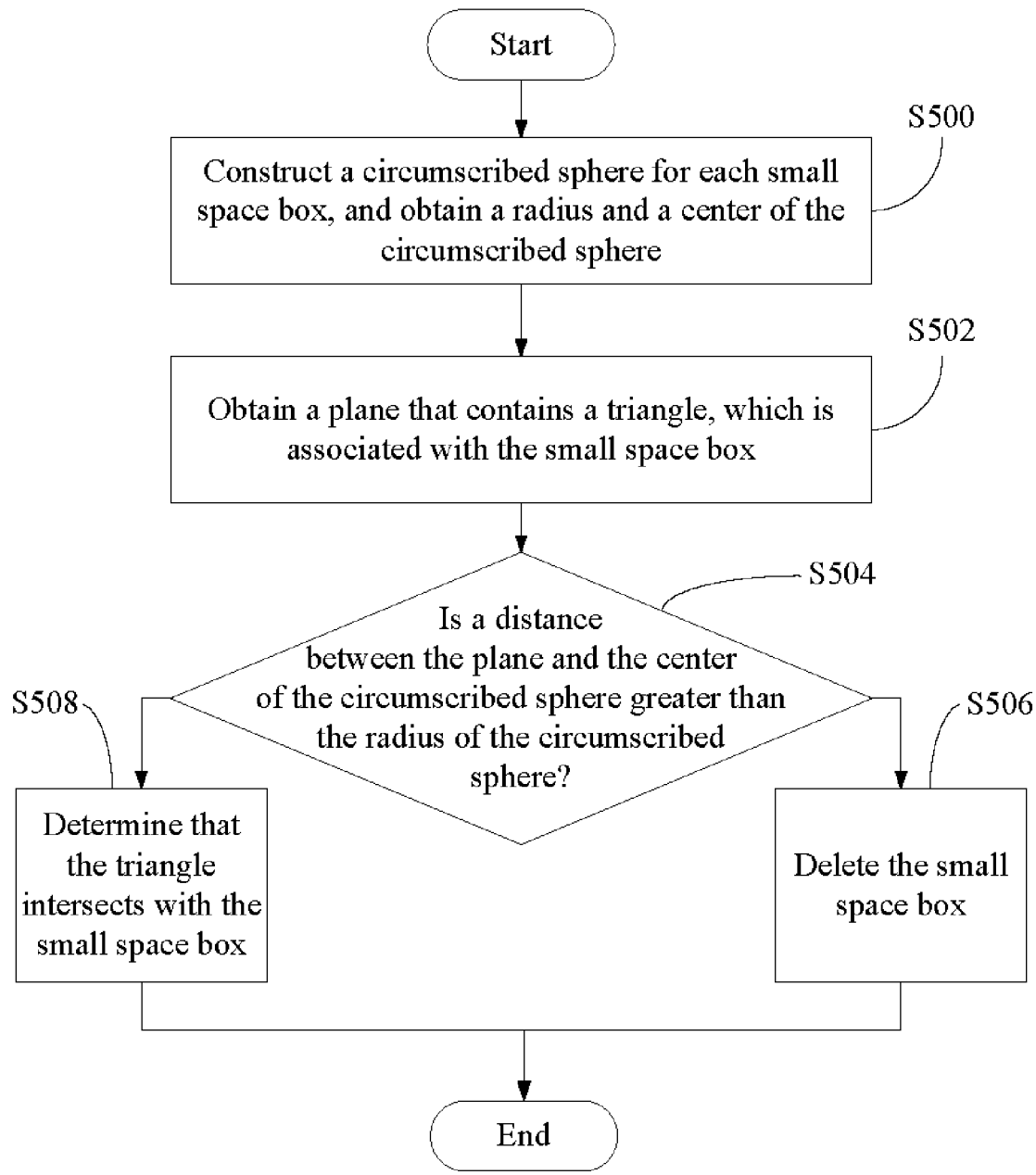
FIG. 6 is a detailed description of step S50 in FIG. 5.

FIG. 6 is a detailed description of step S50 in FIG. 5. In step S500, the first association module 162 constructs a circumscribed sphere for each of the small space boxes, and obtains a radius and a center of the circumscribed sphere.

In step S502, the first association module 162 obtains a plane that contains a triangle, which is associated with the small space box.

In step S504, the first association module 162 determines whether a distance between the plane and the center of the circumscribed sphere is greater than the radius of the circumscribed sphere. Upon the condition that the distance is greater than the radius, step S506 is implemented. Upon the condition that the distance is not greater than the radius, the flow goes to step S508.

In step S506, the first association module 162 deletes the small space box. In step S508, the first association module 162 determines that the triangle intersects with the small space box.

Although certain inventive embodiments of the present disclosure have been specifically described, the present disclosure is not to be construed as being limited thereto. Various changes or modifications may be made to the present disclosure without departing from the scope and spirit of the present disclosure.

What is claimed is:

1. A computer-implemented method for extracting data of a product using a computing device, the method comprising:
   receiving an electronic design document of the product, receiving a point cloud of the product created using actual measurements of the product, and a tolerance between a curved surface of the product in the electronic design document and the curved surface of the product in the point cloud, the point cloud comprising a plurality of points of the product;
   aligning the curved surface of the product with the corresponding portion of the point cloud using a best-fit method;
   creating a maximum space box for a feature element of the product by determining a maximum coordinate value and a minimum coordinate value of the feature element in an x-axis, a y-axis, and a z-axis of a coordinate system, and deleting points that are not within the maximum space box;
   dividing the maximum space box into a plurality of small space boxes according to an average distance between two neighboring points of the point cloud, and the maximum coordinate values and the minimum coordinate values of the feature element;
   obtaining points of interest that are composed of the feature element by filtering the points of the point cloud using the plurality of small space boxes, wherein the filtering uses the tolerance; and
   outputting the points of interest on a display device of the computing device, and drawing the feature element of the product based on the points of interest.

2. The method as described in claim 1, wherein the obtaining step comprises:
   dividing the curved surface of the product into a mesh of triangles;
   determining whether one of the triangles intersects with a small space box;
   upon the condition that any of the triangles intersects with any of the small space boxes, associating the triangle with the small space box by adding an identifier of the triangle into a data array of the small space box;
   calculating a unique identifier nG for each small space box that contains at least one point of the point cloud;
   upon the condition that the small space box whose unique identifier is nG has a associated triangle, associating the small space box with the at least one point that is within the small space box;
   deleting the small space boxes that do not have associated triangles, deleting the points that are not within any one of the small space boxes, and obtaining a group of remaining points of the point cloud after the deleting;
   calculating a distance between each of the remaining points and a corresponding small space box that encloses the remaining point;
   upon the condition that the distance between one of the remaining points and the corresponding small space box is greater than the tolerance, deleting the remaining point from the group of remaining points; or
   upon the condition that a normal direction of one of the remaining points is different from a normal direction of the corresponding small box that is associated with the remaining point, deleting the remaining point from the group of remaining points.

3. The method as described in claim 2, wherein the step of determining whether one of the triangles intersects with a small space box comprises:
   deleting the small space box that does not associate with any one of the triangles;
   upon the condition that an intersection of one small space box and a plane containing a triangle is within the triangle, determining that the triangle intersects with the small space box;
   upon the condition that all vertexes of one triangle are within one of the small space boxes, determining that the triangle intersects with the small space box; and
   upon the condition that an intersection of one side of the triangles and a small space box is within the small space box, determining that the triangle intersects with the small space box.

4. The method as described in claim 3, wherein the step of deleting the small space box that does not associate with one of the triangles comprises:
   constructing a circumscribed sphere for each of the small space boxes, and obtaining a radius and a center of the circumscribed sphere;
   obtaining a plane that contains the triangle, which is associated with the small space box;
   upon the condition that a distance between the plane and the center of the circumscribed sphere is not greater than the radius of the circumscribed sphere, determining that the triangle intersects with the small space box; or
   upon the condition that distance is greater than the radius of the circumscribed sphere, deleting the small space box.

5. The method as described in claim 1, wherein the feature element is selected from a group consisting of a point, a line, a plane, a circle, a column, a taper, a sphere, a curve, and a triangular facet.

6. A computing device, comprising:
   at least one processor;
   a storage system; and
   one or more modules that are stored in the storage system and executed by the at least one processor, the one or more modules comprising:
   a receiving module that receives an electronic design document of the product, receives a point cloud of the product created using actual measurements of the product, and a tolerance between a curved surface of the product in the electronic design document and the curved surface of the product in the point cloud, the point cloud comprising a plurality of points of the product;
   a aligning module that aligns the curved surface of the product with the corresponding portion of the point cloud using a best-fit method;
   a crude filter module that creates a maximum space box for a feature element of the product by determining a maximum coordinate value and a minimum coordinate value of the feature element in an x-axis, a y-axis, and a z-axis of a coordinate system, and deletes points that are not within the maximum space box;
   a fine detail filter module that divides the maximum space box into a plurality of small space boxes according to an average distance between two neighboring points of the point cloud, and the maximum coordinate values and the minimum coordinate values of the feature element, and obtains points of interest that are composed of the feature element by filtering the points of the point cloud using the plurality of small space boxes, wherein the filtering uses the tolerance; and
   an output module that outputs the points of interest on a display device of the computing device, and draws the feature element of the product based on the points of interest.

7. The computing device as described in claim 6, wherein the further filter module comprises:
   a box constructing module that divides the maximum space box into a plurality of small space boxes according to an average distance between two neighboring points of the point cloud, and the maximum coordinate values and the minimum coordinate values of the feature element, and each of the small space boxes corresponding to a data array;
   a first association module that divides the curved surface of the product into a mesh of triangles, determines whether one of the triangles intersects with a small space box, and associates the triangle with the small space box that intersects with the triangle by adding an identifier of the triangle into the data array of the small space box;
   a second association module that calculates a unique identifier nG for each small space box that contains at least one point of the point cloud, and associates the small space box with the at least one point that is within the small space box, upon the condition that the small space box whose unique identifier is nG has a associated triangle;
   a deleting module that deletes the small space boxes that do not intersect with any one of the triangles, deletes the points that are not within any one of small space boxes, and obtains a group of remaining points of the point cloud after the deleting; and
   the deleting module that further calculates a distance between each of the remaining points and a corresponding small space box that is associated with the remaining point, upon the condition that the distance between one of the remaining points and the corresponding small space box is greater than the tolerance, deletes the remaining point from the group of remaining points, or upon the condition that a normal direction of one of the remaining points is different from a normal direction of the corresponding small box that is associated with the remaining point, deletes the remaining point from the group of remaining points.

8. The computing device as described in claim 7, wherein the first association module executes following steps to determine whether one of the triangles intersects with a small space box:
   deleting the small space box that does not associate with any one of the triangles;
   upon the condition that an intersection of one small space box and a plane containing a triangle is within the triangle, determining that the triangle intersects with the small space box;
   upon the condition that all vertexes of one triangle are within one of the small space boxes, determining that the triangle intersects with the small space box; and
   upon the condition that an intersection of one side of the triangles and a small space box is within the small space box, determining that the triangle intersects with the small space box.

9. The computing device as described in claim 8, wherein the second association module executes following steps to delete the small space box that does not associate with any one of the triangles:
   constructing a circumscribed sphere for each of the small space boxes, and obtaining a radius and a center of the circumscribed sphere;
   obtaining a plane that contains the triangle, which is associated with the small space box;
   upon the condition that a distance between the plane and the center of the circumscribed sphere is not greater than the radius of the circumscribed sphere, determining that the triangle intersects with the small space box; or
   upon the condition that distance is greater than the radius of the circumscribed sphere, deleting the small space box.

10. The computing device as described in claim 6, wherein the feature element is selected from a group consisting of a point, a line, a plane, a circle, a column, a taper, a sphere, a curve, and a triangular facet.

11. A non-transitory computer readable storage medium having stored thereon instructions that, when executed by a processor of a computing device, causes the computing device to perform a method for extracting data of a product, the method comprising:
   receiving an electronic design document of the product, receiving a point cloud of the product created using actual measurements of the product, and a tolerance between a curved surface of the product in the electronic design document and the curved surface of the product in the point cloud, the point cloud comprising a plurality of points of the product;
   aligning the curved surface of the product with the corresponding portion of the point cloud using a best-fit method;
   creating a maximum space box for a feature element of the product by determining a maximum coordinate value and a minimum coordinate value of the feature element in an x-axis, a y-axis, and a z-axis of a coordinate system, and deleting points that are not within the maximum space box;

dividing the maximum space box into a plurality of small space boxes according to an average distance between two neighboring points of the point cloud, and the maximum coordinate values and the minimum coordinate values of the feature element;

obtaining points of interest that are composed of the feature element by filtering the points of the point cloud using the plurality of small space boxes, wherein the filtering uses the tolerance; and outputting the points of interest on a display device of the computing device, and drawing the feature element of the product based on the points of interest.

12. The storage medium as described in claim 11, wherein the obtaining step comprises:

dividing the curved surface of the product into a mesh of triangles;

determining whether one of the triangles intersects with a small space box;

upon the condition that any of the triangles intersects with any of the small space boxes, associating the triangle with the small space box by adding an identifier of the triangle into a data array of the small space box;

calculating a unique identifier nG for each small space box that contains at least one point of the point cloud;

upon the condition that the small space box whose unique identifier is nG has a associated triangle, associating the small space box with the at least one point that is within the small space box;

deleting the small space boxes that do not have associated triangles, deleting the points that are not within any one of the small space boxes, and obtaining a group of remaining points of the point cloud after the deleting;

calculating a distance between each of the remaining points and a corresponding small space box that encloses the remaining point;

upon the condition that the distance between one of the remaining points and the corresponding small space box is greater than the tolerance, deleting the remaining point from the group of remaining points; or upon the condition that a normal direction of one of the remaining points is different from a normal direction of the corresponding small box that is associated with the remaining point, deleting the remaining point from the group of remaining points.

13. The storage medium as described in claim 12, wherein the step of determining whether one of the triangles intersects with a small space box comprises:

deleting the small space box that does not associate with any one of the triangles;

upon the condition that an intersection of one small space box and a plane containing a triangle is within the triangle, determining that the triangle intersects with the small space box;

upon the condition that all vertexes of one triangle are within one of the small space boxes, determining that the triangle intersects with the small space box; and upon the condition that an intersection of one side of the triangles and a small space box is within the small space box, determining that the triangle intersects with the small space box.

14. The storage medium as described in claim 13, wherein the step of deleting the small space box that does not associate with any one of the triangles comprises:

constructing a circumscribed sphere for each of the small space boxes, and obtaining a radius and a center of the circumscribed sphere;

obtaining a plane that contains the triangle, which is associated with the small space box;

upon the condition that a distance between the plane and the center of the circumscribed sphere is not greater than the radius of the circumscribed sphere, determining that the triangle intersects with the small space box; or upon the condition that distance is greater than the radius of the circumscribed sphere, deleting the small space box.

15. The storage medium as described in claim 11, wherein the feature element is selected from a group consisting of a point, a line, a plane, a circle, a column, a taper, a sphere, a curve, and a triangular facet.

* * * * *